(12) United States Patent
Hernando Fernandez (10) Patent No.: US 7,645,961 B2
(45) Date of Patent: Jan. 12, 2010

(54) IMAGE ACQUISITION UNIT WITH HEATING DEVICE FOR MONITORING THE EXTERIOR OF A VEHICLE

(75) Inventor: Francesc Xavier Hernando Fernandez, Terrassa (ES)

(73) Assignee: Fico Mirrors, SA, Barcelona (ES)

( * ) Notice: Subject to any disclaimer, the term of this patent is extended or adjusted under 35 U.S.C. 154(b) by 0 days.

(21) Appl. No.: 10/526,998

(22) PCT Filed: May 22, 2003

(86) PCT No.: PCT/ES03/00241

§ 371 (c)(1),
(2), (4) Date: Oct. 18, 2005

(87) PCT Pub. No.: WO2004/105395

PCT Pub. Date: Dec. 2, 2004

(65) Prior Publication Data

US 2006/0108352 A1    May 25, 2006

(51) Int. Cl.
*H05B 1/00* (2006.01)
(52) U.S. Cl. ............... 219/209; 219/201; 219/219; 219/511; 348/148; 359/871
(58) Field of Classification Search ............ 219/209, 219/201, 522, 219, 511; 348/373, 375, 148; 359/871
See application file for complete search history.

(56) References Cited

U.S. PATENT DOCUMENTS

| | | | | |
|---|---|---|---|---|
| 5,173,585 | A * | 12/1992 | Dokken | 219/201 |
| 5,198,639 | A * | 3/1993 | Smuckler | 219/219 |
| 5,525,977 | A * | 6/1996 | Suman | 340/825.25 |
| 5,699,857 | A * | 12/1997 | Flaishans et al. | 165/202 |
| 6,333,759 | B1 * | 12/2001 | Mazzilli | 348/148 |
| 6,498,620 | B2 * | 12/2002 | Schofield et al. | 348/148 |
| 6,512,203 | B2 * | 1/2003 | Jones et al. | 219/219 |
| 6,738,088 | B1 * | 5/2004 | Uskolovsky et al. | 348/148 |
| 6,878,907 | B2 * | 4/2005 | Hiramatsu et al. | 219/444.1 |
| 6,959,994 | B2 * | 11/2005 | Fujikawa et al. | 359/871 |

FOREIGN PATENT DOCUMENTS

| | | |
|---|---|---|
| EP | 0 582 236 | 2/1994 |
| EP | 0 591 743 | 4/1994 |

(Continued)

OTHER PUBLICATIONS

International Search Report for PCT/ES 03/00241 mailed Sep. 29, 2003.

*Primary Examiner*—Tu B Hoang
*Assistant Examiner*—Vinod D Patel
(74) *Attorney, Agent, or Firm*—RatnerPrestia (57) ABSTRACT

The unit comprises: a casing (1) with a protected interior, a window (2) closed by a transparent element (3) and support means (4) to carry an optical system (5) facing said window (2); image detection means (6) accommodated in said casing (1), facing said optical system (5), an associated with connection means with the exterior for the supply and/or bidirectional signal exchange; and heating means to provide thermal energy to said transparent element (3), or to an adjacent zone thereto, aiming at avoiding lacking transparency problems, due to ambient and climatic factors.

38 Claims, 5 Drawing Sheets

FOREIGN PATENT DOCUMENTS

| | | |
|---|---|---|
| EP | 1 271 179 | 1/2003 |
| JP | 06-37802 | 5/1994 |
| JP | 06-258713 | 9/1994 |
| JP | 07-131688 | 5/1995 |
| JP | 2002-341432 | 11/2002 |

* cited by examiner

IMAGE ACQUISITION UNIT WITH HEATING DEVICE FOR MONITORING THE EXTERIOR OF A VEHICLE

This application is a U.S. National Phase Application of PCT International Application No. PCT/ES 03/00241, filed May 22, 2003.

SCOPE OF THE INVENTION

The present invention relates to an image acquisition unit with heating device for providing thermal energy to a transparent element and/or optical system through which the unit acquires information, with the target to avoid lacking transparency problems, due to ambient and climatic factors.

The image acquisition unit of the present invention is applicable to the exterior monitoring of a vehicle.

BACKGROUND OF THE INVENTION

It is well known to use at least one image acquisition unit including an image detector, as an analogue camera or a CCD or CMOS technology device, located in a place of the vehicle's exterior, in order to obtain digitized data representative of some captured images by said image detector, being said data susceptible to be treated later on by electronic means to provide, for example, warning signals for the conductor or a rear image shown on a screen.

It is usual to incorporate one of said image acquisition units in a exterior rear view mirror unit of the vehicle, in order to provide digitized data representative of a rear image, apart from the rear image reflected by the reflector. Due to the fact that the image acquisition unit is located in the exterior of the vehicle, although it is protected up to a certain point against humidity by a specific casing and/or a casing of the rear view mirror, it is exposed to ambient and climatic conditions, which lead to well known problems that may leave the image acquisition unit out of order. The most frequent problems are the following:

- appearing of a dew, frost or ice layer in an exterior glass of the image acquisition unit due to elevated exterior humidity conditions in combination with low temperatures;
- steaming up in different surfaces which form the optical system of the image acquisition unit, due to the presence of humidity in the interior of the casing and to temperature differences between the interior and exterior of the casing;
- accumulation of water drops or snowflakes on the exterior glass of the image acquisition unit, due to rain, snow, water sprinkles, etc.;
- accumulation of dust, dirt, etc.

The reflector surface of the rear view mirror is also exposed to the majority of previous stated problems and it is known to incorporate some heating means, for example, in the form of a configuration of serigraphic resistive paste or ink lines on the rear surface of the reflector and connected to a vehicle's direct current power supply, analogue to the one used in the electrically heated rear window.

There is the need to dispose of some means to avoid lacking transparency problems, due to ambient and climatic factors in an exterior glass surface or in the optical system of the image acquisition unit. Nevertheless, neither on the market, nor through any document, no image acquisition unit is known for monitoring the exterior of a vehicle equipped with a heating device for that target.

The aim of the present invention is to provide an image acquisition unit for the monitoring of the exterior of a vehicle, provided with a heating device for providing thermal energy to a transparent element and/or optical system of the unity, in order to avoid lacking transparency problems, due to ambient and climatic factors.

SHORT DESCRIPTION OF THE INVENTION

The previous aim, according to the present invention, is achieved by providing an image acquisition unit with heating device for monitoring the exterior of a motor vehicle, wherein it comprises, in conjunction, a casing with a protected interior, a window closed by a transparent element and supporting means for supporting an optical system facing said window; image detection means located in said casing, facing said optical system, and associated with connection means with the exterior, for supplying and/or for signals bidirectional interchange; and heating means for providing thermal energy to said transparent element, or to an adjacent zone thereto.

The mentioned heating means can use different energy sources and different conduction ways for said energy. According to a preferred embodiment, the heating means comprise at least an electrical heater supplied with direct current from said connection means with the exterior of the image acquisition unit, which are typically connected with an electrical supply system of the motor vehicle. Even though, said electrical heater could be continuously ON during all the time in which the electrical supply system of the motor vehicle was connected, it is preferred to incorporate some control means to control the operation of said electrical heater, so that it only operates when ambient and climatic conditions require this.

A simple way to incorporate said control means comprises providing an on-off switch to control the activation time of said supply current of the electrical heater. This on-off switch may be, for example, associated with a thermostat, for its automatic activation as a function of a local temperature in the image acquisition unit or at a vehicle's user disposal, for its voluntary activation as a function of a subjective appreciation of the user. In this second case, the on-off switch may be common for at least another heating device of the vehicle, as, for example, a rear window heating system and/or an exterior rear view mirror heating system. In this way, when the motor vehicle's user considers that the ambient or climatic conditions are adverse, by activating a single switch he may activate or deactivate the various systems designated to avoid lacking transparency problems in different elements of the motor vehicle.

Another more complex embodiment for said control means comprises the use of a central processor of the vehicle, for example, in case that said processor is incorporated in the vehicle's production model, as it is more usual every day. In this embodiment, the control means comprises a man-machine interface to provide different parameters to the mentioned central processor of the vehicle, which is provided with an adapted program to control the supply current of the electrical heater through time as a function of the result of an analysis and processing of said parameters, which may come from, for example, one or more detectors associated with the image acquisition unit and/or with other parts of the vehicle, and/or from an instructions and data input device at a vehicle's user disposal. Generally, these parameters include, at least, the temperature in the interior of the casing of the image acquisition unit and the exterior ambient temperature, and can include, furthermore, the interior and exterior humidity and others.

According to an embodiment, said electrical heater comprises at least an electrical resistance applied directly on said transparent element, advantageously in the form of an open ring of serigraphic resistive ink or paste on the internal face of said transparent element. The mentioned resistive ink or paste may be, for example, of the type including graphite, Cu, Ag or Cu—Ag. In case the resistive ink or paste is weldable, connection lines will be directly connected to the ends of said open ring of resistive ink or paste. When the resistive ink or paste is not weldable, a layer of weldable conductive ink or paste will be incorporated at least at the ends of said open ring of resistive ink or paste, in order to execute the connection of said wires. Advantageously, said layer of weldable conductive ink or paste will be, furthermore, extended along one or more variable length sections of the open ring of resistive ink or paste, in order to reduce its resistance and, therefore, adjust the heating power to a requested value. In those cases in which it may be seen as necessary, the resistance may comprise a layer of a protective mask material applied on said resistive ink or paste and/or conductive ink or paste, with the aim of protecting the electrical resistance against saline mist, kesternich chamber, etc., according to standard tests executed in the automotive sector.

As an alternative, the electrical heater may comprise at least one electrical resistance applied in a wrapping manner on an external or internal surface of a zone on the casing adjacent to the transparent element. At any rate, when an electrical resistance is used as heating element, the material of which the electrical resistance is made of, also influences on the heater's temperature control. For example, if the electrical resistance is of a material like PTC (Positive Temperature Coefficient), the resistance of which increases with the increase of its temperature, the heater shows a relatively short reaction time until reaching its stabilization temperature in comparison to a constant resistance material, which has a longer reaction time, but reaches a higher stabilization temperature.

According to an embodiment without electrical resistance, the heating means comprise at least one element consisting of a good heat conductive material to transfer heat from a zone of the casing, where said image detection means are located, to an adjacent zone to the transparent element, or close to it. Herewith, it is possible to make use of the heat dissipation generated by the memory chips and other specific applications included in the image acquisition unit to heat the zone where the optical elements of the unit are located. For this heat exchange a Peltier cell may be used.

Finally, according to another embodiment without electrical resistance, the heating means comprise an air expulsion nozzle located near the transparent element and connected to a heating or air conditioning system of a vehicle's compartment to create a warm air barrier facing the outer face of the transparent element. This system avoids the condensation of the humidity or the creation of a dew or ice layer on the transparent element and, furthermore, this air curtain provides an additional protection against water drops, no matter if due to the rain or to other sprinkling causes, and dust particles and dirt.

In those embodiments in which the heater is directly applied on the casing of the image acquisition unit, it is advantageous that the material of said casing has a good heat transfer coefficient. It could be considered that the heat transferred by the casing from the zone where the electronic devices are located, was sufficient to heat the transparent element sufficiently to avoid the mentioned ambient and climatic problems, without the need of using an electrical heater.

SHORT DESCRIPTION OF THE DRAWINGS

The previous and other characteristics and advantages turn out to be more clear from the following detailed description of some embodiments with reference to the accompanying drawings, in which.

DETAILED DESCRIPTION OF SOME EMBODIMENTS

Referring to FIGS. 1 and 7 to 9, an image acquisition unit is shown with a heating device for monitoring the exterior of a motor vehicle comprising, generally, a casing 1 which provides a protected interior, with a window 2 closed by a transparent element 3, as for example a protecting glass, and support devices 4 to support an optical system 5 facing said window 2. Located in said casing 1 are image detection means 6 including an image detector 11, such as an analogue camera or a CCD or CMOS technology device, located in front of said optical system 5 and electronic components associated with connection devices with the exterior, such as a flat tape wiring 12 ending in a connector 13, for the supply and/or signals bidirectional exchange. The unit includes, finally, heating devices to provide thermal energy to said transparent element 3, or to an adjacent zone thereto, aiming at avoiding lacking transparency problems arising from ambient and climatic factors.

It has to be pointed out that, together with said heating devices, regarding some embodiments described in detail later on other factors influence the protection of the transparency conditions of the protecting glass 3. One of those factors is the positioning of the protecting glass 3 in a position as exterior as possible of the casing 1 so that the accumulation of water, snow and dust facing the transparent element 3 is avoided. Herewith, furthermore, the cleaning of the transparent element 3 is made easier from the exterior of the camera. It is also an advantageously fact that the exterior surface of the transparent element 3 is treated with a hydrophilic, water-repellent and antireflection system.

The mentioned heating means may be of various types. According to a first type, the heating means comprise at least one electrical heater supplied with direct current from said connection devices with the exterior, which may be shared with the connection means of the image detection means 6 or independent ones. According to a second type, the heating means use the heat transfer from existing heat sources in the motor vehicle or in the image acquisition unit itself to said transparent element 3, or to an adjacent zone thereto.

When using an electrical heater, preferably some control means 500 (shown in FIG. 10) are included to control its operation. The mentioned control means 500 may comprise, for example, an on/off switch 504 to control the activation time of said supply current of the electrical heater, and this on/off switch may be associated with or integrated in a thermostat 506 or located in the control panel 502 of the motor vehicle at a vehicle's user disposal. Advantageously, said on/off switch is common for one or more heating devices 508 of the vehicle, as for example a heating system of a rear window or a heating system of an exterior rear view mirror.

Figure 10:
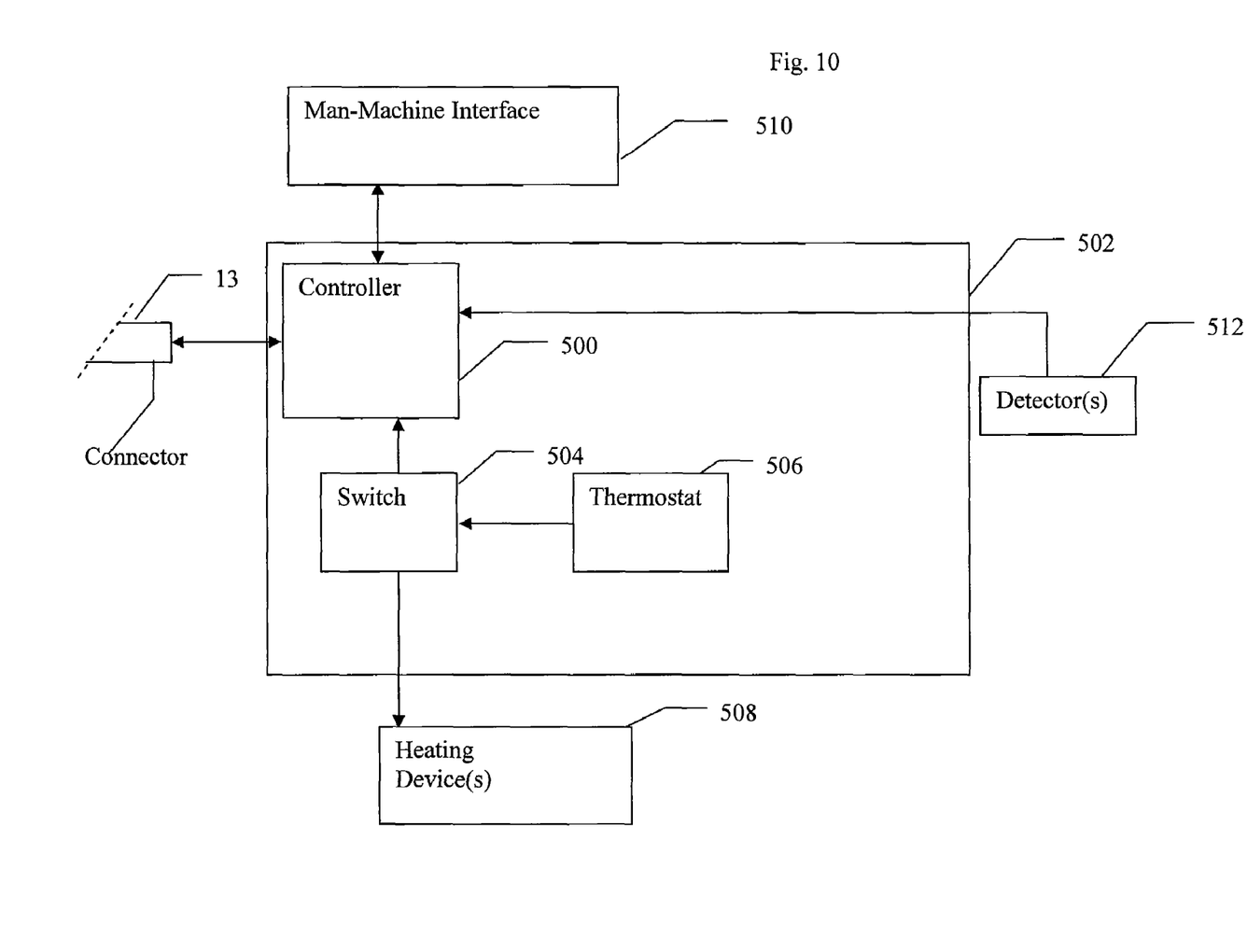
FIG. 10 is a block diagram illustrating exemplary control of the heater of the image acquisition unit of the present invention.

According to another variant, said control means 500 use a central processor of the vehicle, or on-board computer, associated with man-machine interface 510 to provide different parameters arising from one or more detectors 512 associated to the image acquisition unit and/or to other parts of the vehicle, and/or from an input device at a vehicle's user disposal, to said computer, in which an adapted program has been loaded to control said supply current of the electrical heater throughout time as a function of the result of an analysis and a processing of said parameters, covering typically at least the temperature inside the casing 1 of the image acquisition unit and the exterior ambient temperature.

Figure 1:
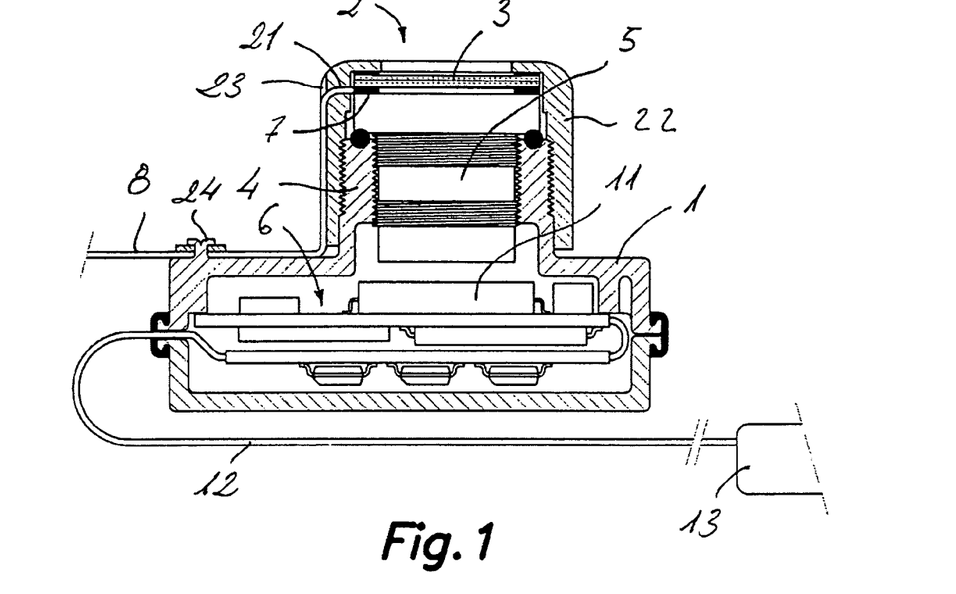
FIG. 1 shows a transversal section view of the image acquisition unit according to an embodiment of the present invention including an electrical heater applied on the transparent element.

According to another embodiment shown in FIG. 1, the electrical heater comprises an electrical resistance 7 directly applied on the internal face of the transparent element 3. The present invention foresees different types of applying this electrical resistance on the transparent element.

Figure 2:
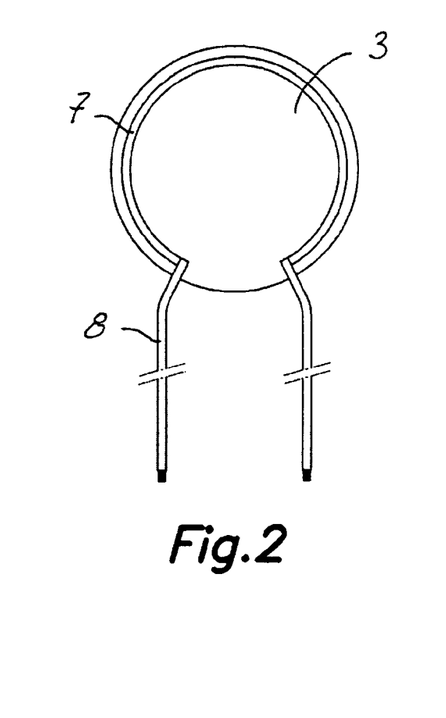
FIGS. 2 to 6 are interior plan views of different variants of the transparent element with electrical heater of the unit of FIG. 1.

In FIG. 2 the transparent element 3 of FIG. 1 is shown, on which the electrical resistance 7 has been located in the form of an open ring of resistive ink or paste, which may be applied by, for example, a well known serigraphic technique. In case that the mentioned resistive ink or paste is weldable, a pair of connection lines 8 are connected by welding directly to the ends of said open ring of resistive ink or paste 7, although they could also be connected by other conventional means, such as for example by an conductive adhesive.

Figure 3:
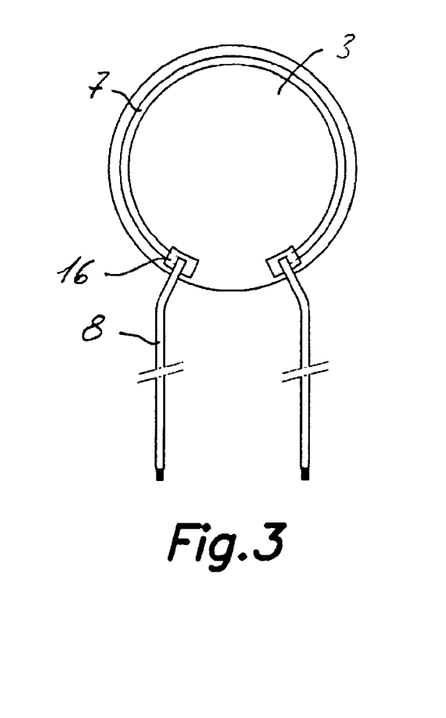

FIG. 3 shows an electrical resistance 7 applied on the transparent element 3 in an analogue way to the one described in relation to FIG. 2, however, in this case the resistive ink or paste is not weldable, as it frequently occurs with this technique. For the connection of the connection lines 8, the heating element comprises a layer of a weldable conductive ink or paste applied on the ends 16 of said open ring of resistive ink or paste 7, and the connection lines 8 are connected to said layer of weldable conductive ink or paste 16.

Figure 4:
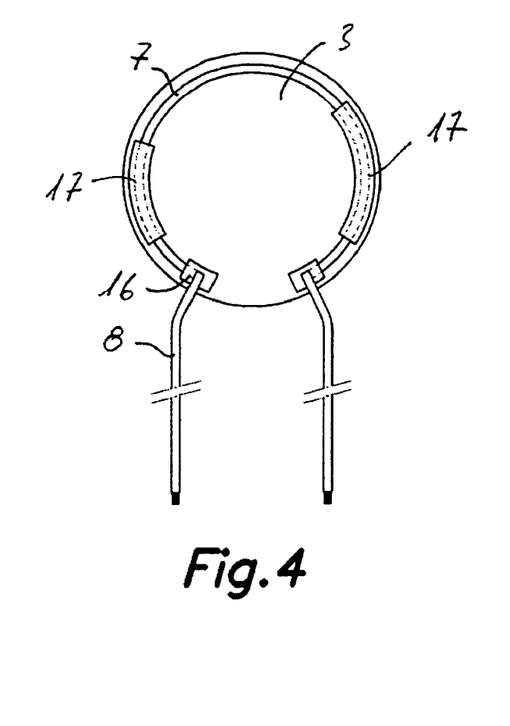

FIG. 4 shows an electrical resistance 7 applied on the transparent element 3 in an analogue way to the one described in relation to FIG. 3, however, in this case, the layer of weldable conductive ink or paste is furthermore extended along one or more sections 17 of the open ring of resistive ink or paste 7, aiming at the reduction of its resistance and, therefore, the adjustment of the heating power to a required value. Advantageously, the application of a layer of weldable conductive ink or paste on the ends 16 of said sections 17 of the open ring of resistive ink or paste 7 is carried out in a single operation.

Figure 5:
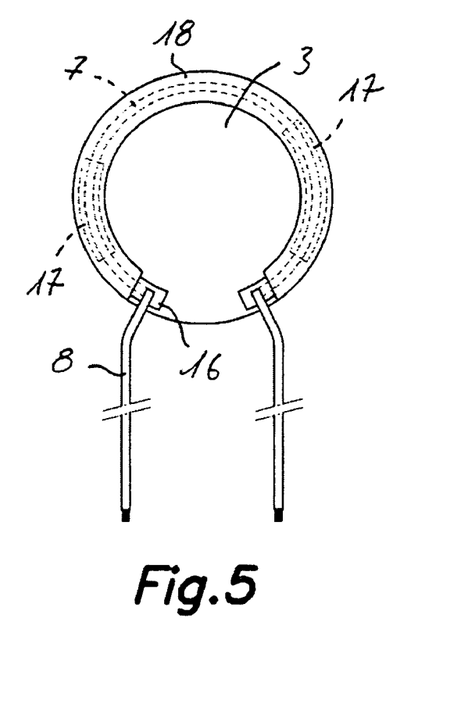

FIG. 5 shows an electrical resistance 7 applied on a transparent element 3 in an analogue way to the one described in relation to FIG. 4, however, including a layer of a protective mask material 18, or protective ink or paste, on said resistive ink or paste 7 and/or conductive ink or paste on sections 17 thereof, aiming at protection the electrical resistance 7. The layer of weldable conductive ink or paste on the ends 16 of the electrical resistance 7 could also be covered with said protective mask 18 in case it would be applied after the welding of the connection lines 8.

Figure 6:
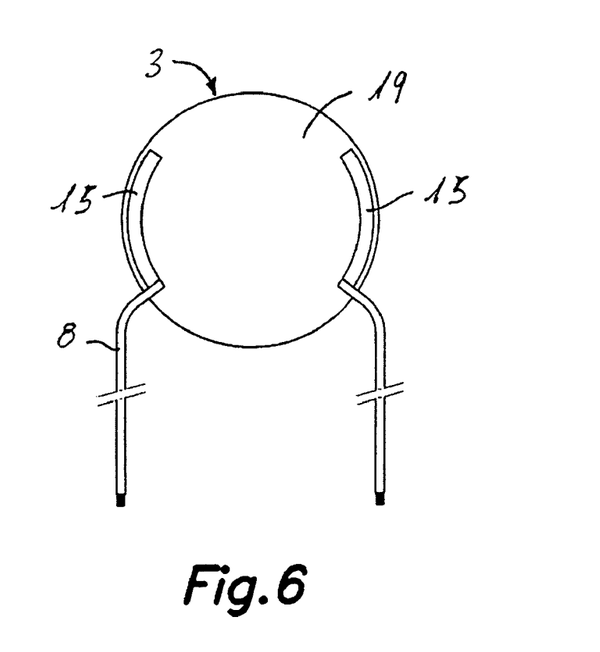

FIG. 6 shows another variant in which said electrical resistance has the form of a laminar layer of a resistive transparent material 19 applied on an internal face of said transparent element 3 covering it completely. On opposite zones of the laminar layer of resistive material 19, and in connection to itself, a pair of conductive ink or paste electrodes 15 are placed, and connection lines 8 are connected to said electrodes 15, so that if electrical current is applied, substantially all the area of the laminar layer of a resistive transparent material 19 is heated. A known and appropriate resistive transparent material is the indium and tin oxide, usually named ITO.

A possible way of passing the connection lines 8 from the interior to the exterior of the casing 1 is shown in FIG. 1, where the connection lines 8 pass through an opening 21 existing in a cap 22, which closes the support means 4 of the optical system 5, and in which window 2 is located with the transparent element 3. The connection lines 8, once in the exterior, are protected inside of slots 23 existing in said cap 22 and in casing 1, to which they are fixed by a clamp 24 or similar. Alternatively, the connection lines 8 could pass internally through a slot in axial direction (not shown), made in a screw thread between the cup 22 and the external surface of the support means 4 of the optical system 5, or between an internal surface of the support means 4 of the optical system 5 and the optical system itself. In this last case, the connection lines 8 could be connected, for example, to the connection wiring of the image detection means 6 without exiting to the exterior of the casing.

Figure 7:
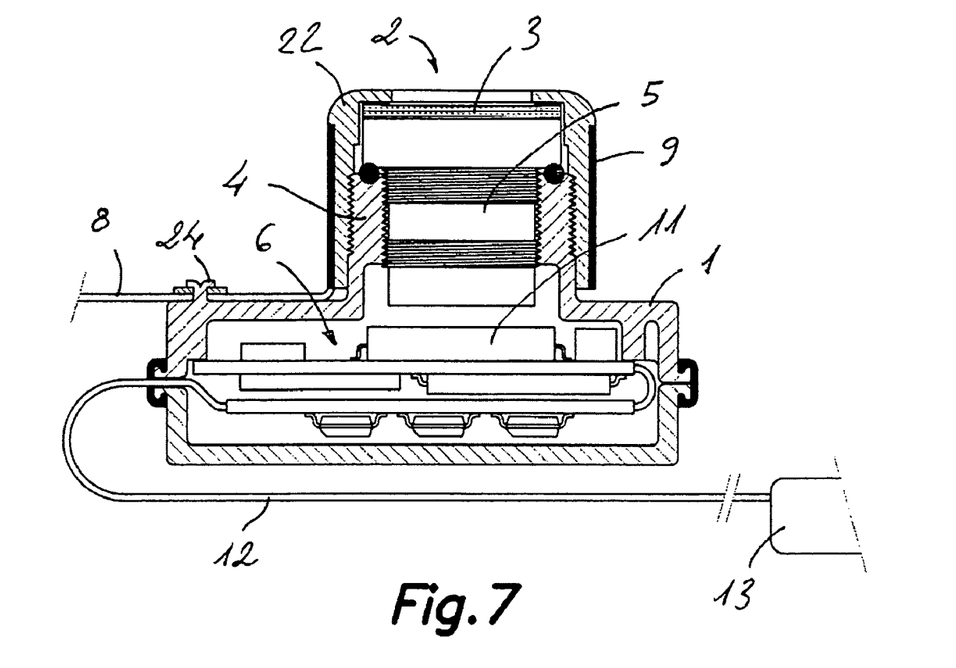
FIGS. 7 and 8 show transversal section views of the image acquisition unit according to embodiments of the present invention, including an electrical heater applied on the casing.
Figure 8:
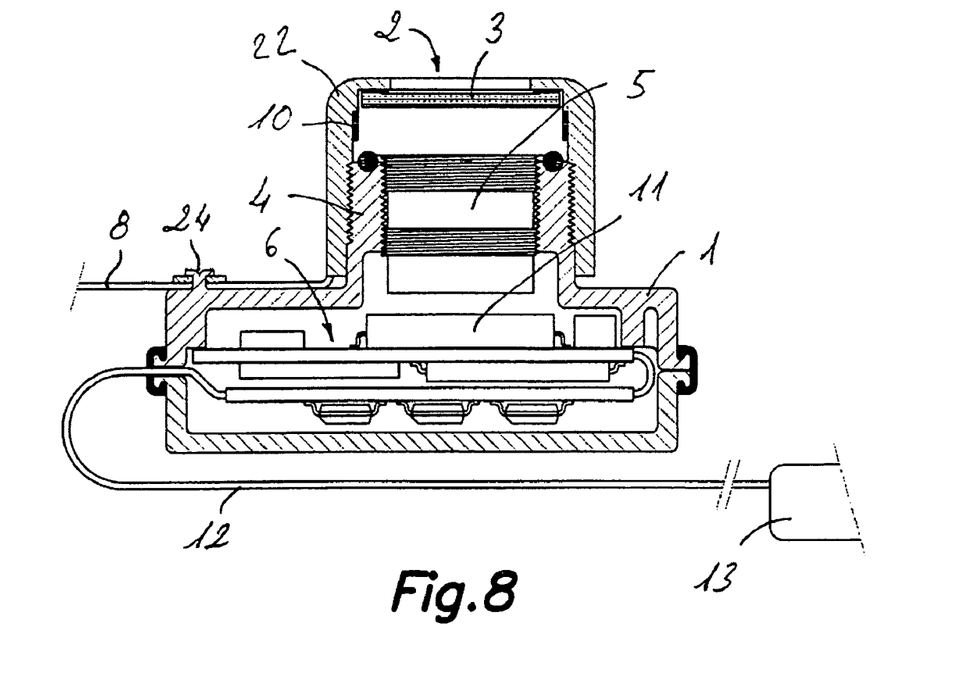

In FIGS. 7 and 8 two more embodiments are shown in which the electrical heater comprises at least one electrical resistance 9, 10 applied in a wrapping manner on a zone of the casing 1 adjacent to the transparent element 3. In the embodiment of the FIG. 7, said electrical resistance 9 is applied on an external surface of that zone of the casing 1 which accommodates and protects the optical system 5 facing the window 2, and being located adjacent to the transparent element 3 which closes window 2. The union of the heating unit to the exterior of the casing 1 may be carried out, for example, by the application of isolating and conductive ink or paste layers, aiming at fulfilling homologation tests. Here, it will be also necessary to connect a pair of connection lines 8 for the supply of the electrical resistance 9. In the embodiment of FIG. 8, the electrical resistance 10 is applied on an internal surface of said zone of the casing 1 adjacent to the transparent element 3, for example, on an interior zone of the cap 22. Resistance 10 may consist of a resistive wire applied, if necessary, on an isolating ink or paste layer, or of a heating system consisting of different impressed isolating and conductive ink or paste layers. At any rate, two connection lines 8 will be connected to the heater's supply.

In any of the above mentioned embodiments based on one or more electrical resistances, said electrical resistance may be of a material, the resistance of which increases with the increase of its temperature, or of a material the resistance of which remains, substantially, constant with its temperature variations.

According to another embodiment, not shown, of the present invention, the heating means do not include an electric heater, but rather comprises at least one element of a good heat conductive material to transfer heat from a zone of the casing 1, where said electronic components of said image detection means 6 are located, to an adjacent zone to the transparent element 3, or close to it. Advantageously, said good heat conductive material is the same material the casing 1 is made of, which, if it is provided with a high enough heat transfer coefficient, is able to properly dissipate the heat generated by the electronic components and, at the same time, to transfer part of it to the zone of the casing 1 adjacent to the transparent element 3. To reach this aim, as appropriate materials for the manufacture of the casing 1, can be mentioned, for example, ZAMAK, aluminum and various thermally conductive plastics. Generally, even in the embodiments including an electrical heater, it turns out to be advantageously if the material of the casing 1 is provided with a high heat transfer coefficient.

The mentioned heat transfer from the zone of the casing 1, where said electric components of said image detection devices 6 are located, to the adjacent or close zone to the transparent element 3, may also be executed according to another, not shown, embodiment, using a Peltier cell.

Figure 9:
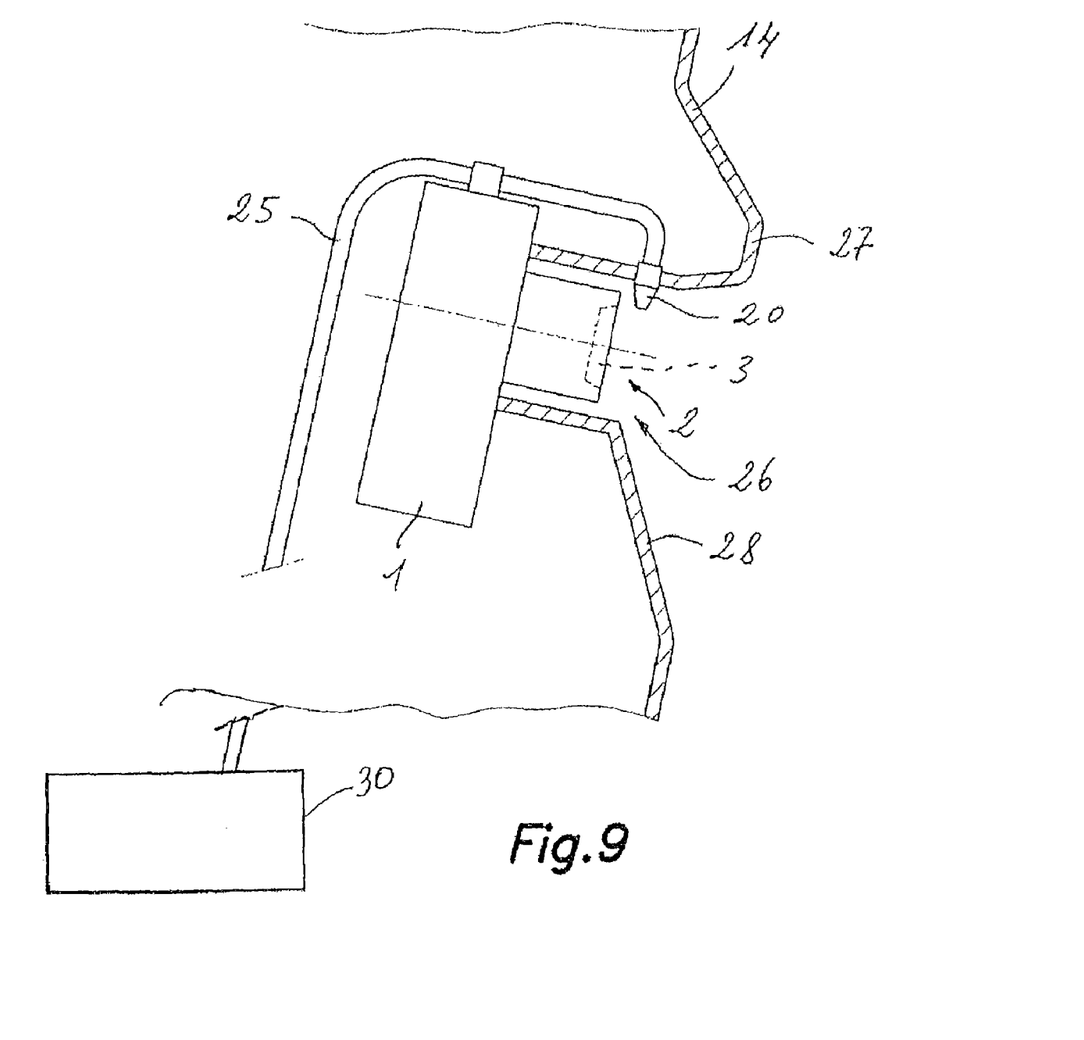
FIG. 9 shows a schematic view of the image acquisition unit according to another embodiment of the present invention, including a warm air expulsion nozzle near the transparent element.

Finally, FIG. 9 shows another embodiment without electrical heater, in which the heating means comprise an air expulsion nozzle 20, located in the exterior of the casing 1 near the transparent element 3. The mentioned air expulsion nozzle 20 is connected to a heating or air conditioning system 30 of a vehicle's compartment through specific conductions 25. Casing 1 is mounted on an external structure 14 of the vehicle, so that the transparent element 3 is facing an opening 26 of said external structure 14 of the vehicle, which defines a visor 27 and a gutter 28 around the mentioned opening. So, when a motor vehicle's occupant turns on the heater or air conditioning to increase the temperature inside the compartment in relation to the exterior ambient temperature, the expulsed air by the air expulsion nozzle 20 creates a warm air curtain facing the external face of the transparent element 3, acting as a barrier avoiding the condensation of humidity and/or the creation of a layer of dew or ice on the transparent element 3 and, furthermore, provides an additional protection against water drops, no matter if the drops arise from rain or other sprinkling causes, and against dust particles and dirt.

The previous embodiments have a merely illustrative and not limiting function regarding the scope of the present invention and a person skilled in the art may introduce variations and modifications without departing said scope defined in the attached claims.

The invention claimed is:

1. An image acquisition unit with a heating device for monitoring an exterior of a vehicle, comprising:
    a casing configured to be mounted on an external structure of said vehicle, said casing comprising a protected interior, said casing defining a window closed by a transparent element and supporting means defined by part of said casing for supporting an optical system inside said casing and facing said window, said optical system dividing the interior of said casing into two separated spaces: a first one enclosed between a first end of said optical system and by the transparent element, and a second one enclosed between a second end of said optical system and part of the casing, being said first space of a smaller volume or dimensions than a volume or dimensions of said second space;
    image detection means located inside said second space of said casing, facing said optical system and associated with connection means with the exterior, for supplying power and/or for bidirectional signal interchange, said image detection means including an image detector and electronic components in contact with the inner air of said second space of said casing; and
    heating means for providing thermal energy to said first space.

2. The image acquisition unit according to claim 1, wherein said heating means comprises at least one electrical heater supplied with direct current from said connection means.

3. The image acquisition unit according to claim 2, further comprising control means for controlling the operation of said electrical heater.

4. The image acquisition unit according to claim 3, wherein said control means comprises an on/off switch to control an activation time of said supply current of the electrical heater.

5. The image acquisition unit according to claim 4, wherein said on/off switch is associated with a thermostat.

6. The image acquisition unit according to claim 5, wherein said on/off switch is common for at least another heating device of the vehicle, selected from a group consisting of: a heating system for a rear window, and a heating system for an external rear view mirror.

7. The image acquisition unit according to claim 4, wherein said on/off switch is at a vehicle user's disposal.

8. The Image acquisition unit according to claim 3, wherein said control means comprises a man-machine interface to provide different parameters coming from one or more detectors associated with the image acquisition unit and/or with other parts of the vehicle, and/or from an input device at a vehicle's user disposal, to a central processor of the vehicle, which supports a program adapted to control said supply current of the electrical heater through time as a function of the result of an analysis and a processing of said parameters.

9. The image acquisition unit according to claim 8, wherein said parameters are selected from a group consisting of an interior temperature of the image acquisition unit casing (1), and the exterior environment temperature.

10. The image acquisition unit according to claim 2, wherein said electrical heater comprises at least one electrical resistance directly applied on said transparent element.

11. The image acquisition unit according to claim 10, wherein said electrical resistance has the form of an open ring of resistive ink or paste applied on the internal face of said transparent element (3).

12. The image acquisition unit according to claim 11, wherein connection lines are connected to end portions of said open ring of resistive ink or paste.

13. The image acquisition unit according to claim 12, further comprises a layer of a protective mask material over said resistive ink or paste and/or conductive ink or paste, in order to protect the electrical resistance.

14. The image acquisition unit according to claim 11, wherein said resistive ink or paste is not weldable and comprises a layer of conductive ink or paste weldable to at least the end portions of said open ring of resistive ink or paste.

15. The image acquisition unit according to claim 14, wherein connection lines are connected to said layer of weldable conductive ink or paste applied on the end portions of said open ring of resistive ink or paste.

16. The image acquisition unit according to claim 15, further comprises a layer of a protective mask material over said resistive ink or paste and/or conductive ink or paste, in order to protect the electrical resistance.

17. The image acquisition unit according to claim 14, wherein said layer of weldable conductive ink or paste is, furthermore, extended along one or more sections of the open ring of resistive ink or paste, in order to reduce its resistance and, therefore, adjust the heating power to a requested value.

18. The image acquisition unit according to claim 17, further comprises a layer of a protective mask material over said resistive ink or paste and/or conductive ink or paste, in order to protect the electrical resistance.

19. The image acquisition unit according to claim 14, further comprises a layer of a protective mask material over said resistive ink or paste and/or conductive ink or paste, in order to protect the electrical resistance.

20. The image acquisition unit according to claim 11, further comprising a layer of a protective mask material over said resistive ink or paste and/or conductive ink or paste, in order to protect the electrical resistance.

21. The image acquisition unit according to claim 10, wherein said electrical resistance has the form of a laminar layer of a resistive transparent material applied on the internal face of said transparent element.

22. The image acquisition unit according to claim 21, wherein a pair of electrodes of conductive ink or paste are applied on opposite zones of the resistive material laminar layer, in connection to itself, and connection lines are connected to said electrodes.

23. The image acquisition unit according to claim 21, wherein said electrical resistance comprises of a material, the resistance of which increases with the increase of its temperature.

24. The image acquisition unit according to claim 21 wherein said electrical resistance comprises a material, the resistance of which remains substantially constant with the temperature variations of itself.

25. The image acquisition unit according to claim 10, wherein said electrical resistance comprises of a material, the resistance of which increases with the increase of its temperature.

26. The image acquisition unit according to claim 10 wherein said electrical resistance comprises a material, the resistance of which remains substantially constant with the temperature variations of itself.

27. The image acquisition unit according to claim 2, wherein said electrical heater comprises at least one electrical resistance applied in an enclosing way on a zone of the casing adjacent to the transparent element.

28. The image acquisition unit according to claim 27, wherein said electrical resistance is applied on an external surface of said zone of the casing adjacent to the transparent element.

29. The image acquisition unit according to claim 27, wherein said electrical resistance is applied on an internal surface of said zone of the casing adjacent to the transparent element.

30. The image acquisition unit according to claim 27, wherein said electrical resistance comprises of a material, the resistance of which increases with the increase of its temperature.

31. The image acquisition unit according to claim 27 wherein said electrical resistance comprises a material, the resistance of which remains substantially constant with the temperature variations of itself.

32. The image acquisition unit according to claim 1, wherein said heating means comprises at least one element of a heat conductive material to transfer heat from a zone of the casing, where electronic components of said image detection means are located, to an adjacent zone to the transparent element, or close to it.

33. The image acquisition unit according to claim 32, wherein said heat conductive material is the material the casing is made of.

34. The image acquisition unit according to claim 1, wherein said heating means comprises a Peltier cell to transfer heat from a zone of the casing, where electronic components of said image detection devices are located, to an adjacent zone to the transparent element, or close to it.

35. The image acquisition unit according to claim 1, wherein said transparent element further comprises a hydrophilic, water repellant and antireflective coating.

36. The image acquisition unit according to claim 1, wherein said casing further comprising a cap coupled to a main body of the casing, said cap supporting said transparent element and said heating means, with said heating means disposed between said transparent element and said image detection means, said cap including a passage extending along at least a portion of said cap for passage of at least one electrical connection from said connection means to said heating means.

37. The image acquisition unit according to claim 36, wherein said heating means is disposed on an exterior surface of said cap and at least partially surrounds said optical system.

38. The image acquisition unit according to claim 36, wherein said heating means is disposed on an interior surface of said cap and at least partially surrounds an area adjacent said optical system.

* * * * *